(12) United States Patent
Birkemose et al.

(10) Patent No.: US 8,511,988 B2
(45) Date of Patent: *Aug. 20, 2013

(54) MONITORING OF BLADE FREQUENCIES OF A WIND TURBINE

(75) Inventors: Bo Birkemose, Brande (DK); Per Egedal, Herning (DK)

(73) Assignee: Siemens Aktiengesellschaft, München (DE)

( * ) Notice: Subject to any disclaimer, the term of this patent is extended or adjusted under 35 U.S.C. 154(b) by 884 days.

This patent is subject to a terminal disclaimer.

(21) Appl. No.: 12/664,989

(22) PCT Filed: Jun. 23, 2008

(86) PCT No.: PCT/EP2008/057923
§ 371 (c)(1),
(2), (4) Date: Dec. 16, 2009

(87) PCT Pub. No.: WO2009/000787
PCT Pub. Date: Dec. 31, 2008

(65) Prior Publication Data
US 2010/0209243 A1   Aug. 19, 2010

(30) Foreign Application Priority Data
Jun. 25, 2007 (DK) ................................ 2007 00913

(51) Int. Cl.
*F03D 1/06* (2006.01)
(52) U.S. Cl.
USPC .................................................. 416/1; 416/61
(58) Field of Classification Search
USPC .............................. 416/1, 25, 31, 40, 41, 500
See application file for complete search history.

(56) References Cited

U.S. PATENT DOCUMENTS

| 4,420,692 | A  | * | 12/1983 | Kos et al. ........................ 290/44 |
| 6,525,518 | B1 | * | 2/2003  | Garnaes ....................... 324/76.13 |
| 7,160,083 | B2 | * | 1/2007  | Pierce et al. ..................... 416/61 |

(Continued)

FOREIGN PATENT DOCUMENTS

| EP | 1 674 724 A2 | 6/2006 |
| EP | 1719910 A1 * | 11/2006 |

(Continued)

OTHER PUBLICATIONS

Lobitz et al., "The Use of Twist-Coupled Blades to Enhance the Performance of Horizontal Axis Wind Turbines", Sandia Report, Sandia National Laboratories, US, No. SAND2001-1303, May 1, 2001, pp. 1-84.

(Continued)

*Primary Examiner* — Edward Look
*Assistant Examiner* — Christopher R Legendre

(57) ABSTRACT

A method for monitoring blade frequencies of a wind turbine and a monitoring system for performing the method are provided. An accelerometer or G-sensor is placed into a nacelle of a wind turbine and thereby measuring the vibrations of the nacelle. To extract the vibration signals originating from each blade, the vibration signals are combined with the measuring signals from the azimuth angle sensor (rotating angle), which is normally used for pitch control. To further extract each blade frequency a Fast Fourier Transformation is used on the modulated G-sensor signals. To further monitor a severe and alarming change in each blade frequency, each blade frequency is compared to the other blade frequencies and an alarm is set when a given level is reached.

19 Claims, 6 Drawing Sheets

(56) References Cited

U.S. PATENT DOCUMENTS

| | | | |
|---|---|---|---|
| 7,822,560 B2 * | 10/2010 | LeMieux | 702/34 |
| 7,854,589 B2 * | 12/2010 | Nielsen et al. | 416/1 |
| 8,021,110 B2 * | 9/2011 | Kerber | 416/1 |
| 8,039,981 B2 * | 10/2011 | Egedal et al. | 290/44 |
| 8,044,670 B2 * | 10/2011 | Bjerge et al. | 324/650 |
| 2004/0108729 A1 * | 6/2004 | Wobben | 290/44 |
| 2006/0140761 A1 * | 6/2006 | LeMieux | 416/61 |
| 2007/0140847 A1 | 6/2007 | Martinez De Lizarduy Romo et al. | |
| 2008/0206051 A1 * | 8/2008 | Wakasa et al. | 416/41 |
| 2008/0206052 A1 * | 8/2008 | Volkmer | 416/61 |
| 2010/0082276 A1 * | 4/2010 | Becker | 702/56 |
| 2010/0158688 A1 * | 6/2010 | Benito et al. | 416/39 |
| 2010/0209243 A1 * | 8/2010 | Birkemose et al. | 416/1 |
| 2012/0173172 A1 * | 7/2012 | Laurberg et al. | 702/56 |
| 2013/0031966 A1 * | 2/2013 | Egedal et al. | 73/112.01 |

FOREIGN PATENT DOCUMENTS

| | | |
|---|---|---|
| GB | 2 117 933 A | 10/1983 |
| WO | WO 99/36695 A1 | 7/1999 |
| WO | WO 02/075153 A1 | 9/2002 |
| WO | 2006012827 A1 | 2/2006 |
| WO | WO 2008/040347 A1 | 4/2008 |

OTHER PUBLICATIONS

Caselitz et al., "Rotor Condition Monitoring for Improved Operational Safety of Offshore Wind Energy Converters", Journal of Solar Energy Engineering, ASME, New York, NY, vol. 127, No. 2, May 1, 2005 pp. 253-261.

Siegfried Heier, "Grid Intergration of Wind Energy Conversion Systems", John Wiley & Sons, Chichester 277270, Jan. 1, 1998, pp. 341-342, XP002532252.

* cited by examiner

MONITORING OF BLADE FREQUENCIES OF A WIND TURBINE

CROSS REFERENCE TO RELATED APPLICATIONS

This application is the US National Stage of International Application No. PCT/EP2008/057923 filed Jun. 23, 2008, and claims the benefit thereof. The International Application claims the benefits of Danish Application No. 200700913 DK filed Jun. 25, 2007. All of the applications are incorporated by reference herein in their entirety.

FIELD OF THE INVENTION

The present invention relates to a method for monitoring blade frequencies of a wind turbine and a monitoring system for performing the method.

BACKGROUND OF THE INVENTION

It is known to monitor blade frequencies of a wind turbine to monitor if the frequencies of each blade are changing due to e.g. material faults in the blades, lightning strikes or other influences. The monitoring is usually done by placing one or more fast responsive sensors like accelerometers, in each blade of a wind turbine. This is an expensive solution because of the need of many expensive sensors.

On existing wind turbines which do not have the mentioned sensors built into the blades to monitor the blade frequencies, it is very difficult and expensive to build in the sensors afterwards as they have to be placed in each blade.

SUMMARY OF THE INVENTION

It is thus an object of the present invention to provide a method for monitoring blade frequencies of a wind turbine and a monitoring system for performing the method which is both easier to build into existing wind turbines and less expensive.

The inventive method for monitoring blade frequencies of a wind turbine with a tower, a nacelle, a hub and one or more rotating blades where an accelerometer or G-sensor placed in the nacelle senses the vibrations of the nacelle comprises the steps of:

modulating the sensed signals or vibrations from the G-sensor, extracting the blade frequencies from the modulated G-sensor signals, e.g. by applying a Fast Fourier Transformation (FFT or DFFT) or a Phase Locked Loop oscillation (PPL).

According to the inventive method, a sensor may sense the rotating angle azimuth of the blades. Then, modulating may be done with a function taking into account the rotating angle azimuth of the blades. For example, modulating could based on the cosine of the rotating angle azimuth of the blades or on the sum of the cosine of the rotating angle azimuth of the blades and a constant number.

Extracting the blade frequencies from the modulated G-sensor signals could be done by applying a Fast Fourier Transformation (FFT or DFFT) or a Phase Locked Loop oscillation (PPL) on the modulated G-sensor signals.

In a further development, the inventive method comprises the step of calculating a new frequency of each blade by comparing each blade frequency to the other blade frequencies and using this comparing to calculate the change in each blade frequency. Alternatively or additionally, the method could also comprise the step of calculating a new frequency of each blade based on the difference between each blade frequency. When the new calculated frequency reaches a certain level, an alarm could be set.

An inventive monitoring system monitors the blade frequencies of a wind turbine comprising a tower, in particular according to the inventive method. It comprises a nacelle, a hub and one or more rotating blades where an accelerometer or G-sensor placed in the nacelle senses the vibrations of the nacelle in a transverse and/or a longitudinal direction and, optionally, a sensor that senses the rotating azimuth angle of the blades. The system is further equipped with a controller or calculating unit with input from the sensed signals. The controller or calculating unit comprises a modulation unit which modulates the sensed signals and a Fast Fourier Transformation (FFT or DFFT) unit or a Phase Locked Loop oscillation (PPL) unit which extracts each blade frequency from the modulated signal.

The controller or calculation unit may further comprise a change detection unit detecting changes in the extracted blade frequencies. Such a change detection unit could, e.g., comprise a difference calculation unit for calculating differences between each blade frequency and a frequency calculation unit for calculating a new frequency of each blade based on the calculated differences. An integrator integrating the absolute value of the calculated differences could be used as the frequency calculation unit.

The inventive system may further comprise an alarm unit which sets an alarm and/or stops the wind turbine when the change of each blade frequency or the new frequency reaches a certain level. Such an alarm unit may be integrated into the controller, in particular into the integrator.

By the invention an accelerometer or G-sensor is placed into the nacelle of a wind turbine and thereby measuring the vibrations of the nacelle. To extract the vibration signals originating from each blade, the vibration signals are, e.g., combined with the measuring signals from the azimuth angle sensor (rotating angle), which is normally used for pitch control. To further extract each blade frequency a Fast Fourier Transformation (FFT) or Phase Locked Loop oscillation (PPL) is used. To further monitor a severe and alarming change in each blade frequency each blade frequency is compared to the other blade frequencies and an alarm is set if a given level is reached.

BRIEF DESCRIPTIONS OF THE DRAWINGS

The invention will now be described in further details with reference to the accompanying drawings in which.

DETAILED DESCRIPTION

Figure 1:
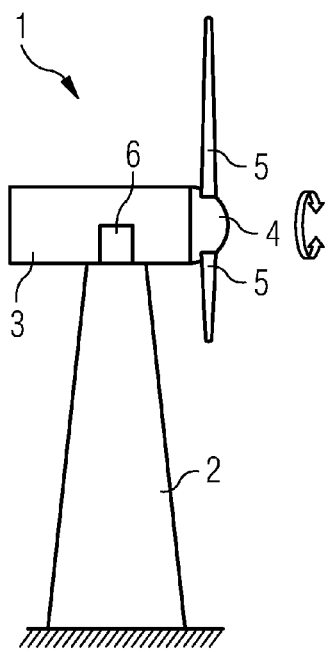
FIG. 1 shows a wind turbine according to the invention in a side view.
Figure 2:
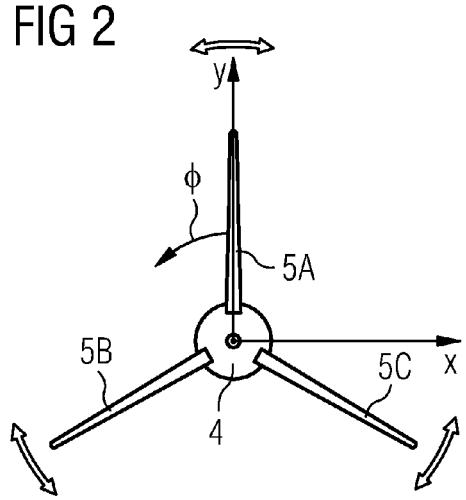
FIG. 2 shows a wind turbine according to the invention in a front view.
Figure 3:
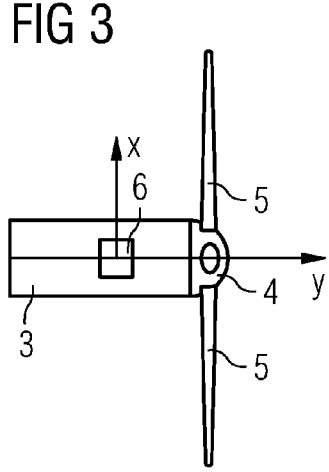
FIG. 3 shows a wind turbine according to the invention in a top view.

The monitoring system is built into a wind turbine 1 as shown in FIGS. 1 to 3 comprising a tower 2, a nacelle 3, a hub 4 and one or more rotating blades 5. The monitoring system consists of an accelerometer 6 (also called a G-sensor) with a built-in controller or calculator (not shown) placed in the nacelle 3 for sensing vibrations of the nacelle 3 originating from the vibrations of each rotating blade 5. The G-sensor senses the vibrations in two directions, transverse the nacelle (x-direction) and along the nacelle (y-direction). As the G-sensor 6 with the built-in controller or calculator is placed in the nacelle 3 on top of the tower 2, it is obvious that the G-sensor senses the frequencies of all the blades through the vibrations of the tower 2. To extract each blade frequency the rotating angle (azimuth angle) Φ of the rotating blades is used by the monitoring system. The rotating azimuth angle Φ is sensed by using a sensor (not shown) which is normally used for the pitch control, which is a common control system of a wind turbine.

By the invention it is hereby possible to use only one G-sensor 6 placed in the nacelle 3 of a wind turbine 1 to monitor each blade frequency. As mentioned above, this is done by also using the azimuth angle sensor for sensing the rotating angle position (azimuth angle) Φ of the blades 5 (A, B and C), and by using the cosinus values of the azimuth angle Φ multiplied with the frequencies in the x-direction monitored by the G-sensor 6 in the nacelle 3 (modulation). By using the cosinus values of the azimuth angle Φ primarily the vibrations in the x-direction of each blade is monitored. This is done with basis in the theory that the frequencies of the blade edge (in the x-direction) have the largest influence on the nacelle with the G-sensor 6, when the blades 5 are in a vertical position (0 or 180 degrees) and almost no influence in the horizontal position (90 or 270 degrees). By using the frequencies corresponding to a displacement of the blades 5 of respectively 0 degrees, 120 degrees and 240 degrees (in a typical three bladed wind turbine), and applying a Fast Fourier Transformation (FFT) to the modulated G-sensor signals, the frequencies of each blade 5 is monitored.

Alternatively the measured frequencies from the G-sensor Φ in the y-direction (along the nacelle) are used to calculate each blade frequency. Then it is not suitable to use the cosinus values of the azimuth angle Φ, as the blades vibrate in the y-direction during the whole 360 degree of rotation. But as the moment load of the tower is larger in the top vertical position of the blades than in the bottom vertical position of the blades, it would be suitable to multiply the sensed frequencies with a function simulating these circumstances, like a constant number (e.g. number 1) added to the cosinus value of the azimuth angle Φ and then dividing this number with 2 ((1+cosinus (azimuth angle Φ))/2). This function gives a number between 1 and 0 in the range of 0 and 360 degrees, and thereby extracting each blade frequency as further described above.

The controller or calculating unit which has input from the sensed signals from the G-sensor 6 and the azimuth angle Φ comprises a modulation unit which modulates the sensed signals, a Fast Fourier Transformation (FFT or DFFT) unit or a Phase Locked Loop oscillation (PPL) unit which extracts each blade frequency from the modulated signals, and further an alarm unit which sets an alarm and/or stops the wind turbine when the change of each blade frequency reaches a certain level. All these units in the controller are not shown.

Looking only at vibrations due to the edgewise resonance frequency, the blade edgewise accelerations for each blade (A, B and C) can be described as the formula below:

$$a_A(t) = k \cdot \cos(\omega_A \cdot t)$$

$$a_B(t) = k \cdot \cos(\omega_B \cdot t)$$

$$a_C(t) = k \cdot \cos(\omega_C \cdot t)$$

Where a(t) is the blade acceleration edgewise, ω is the edge wise resonance frequency, t is the time and k is a constant.

The edge vibrations in the blade are coupled into the nacelle with a 1 p modulation (once per revolution modulation). Assuming that the blade edge vibrations couple most with the nacelle, when the blades have a vertical position (as earlier described), the nacelle vibrations can approximately be described by:

$$a_X(t, \phi) = \left( a_A(t) \cdot \cos(\phi) + a_B(t) \cdot \cos\left(\phi - \frac{2 \cdot \pi}{3}\right) + a_C(t) \cdot \cos\left(\phi - \frac{4 \cdot \pi}{3}\right) \right) \cdot k_2$$

Where $a_X(t,\Phi)$ is the nacelle acceleration, $a_A$ is the blade A acceleration edgewise, $a_B$ is the blade B acceleration edgewise, $a_C$ is the blade C acceleration edgewise, Φ is the rotor azimuth angle and $k_2$ is a constant.

Modulation of the $a_x$ signal again with respect to the individual blade position gives 3 new signals defined by:

$$am_A = a_X \cdot \cos(\phi)$$

$$am_B = a_X \cdot \cos\left(\phi - \frac{2 \cdot \pi}{3}\right)$$

$$am_C = a_X \cdot \cos\left(\phi - \frac{4 \cdot \pi}{3}\right)$$

Figure 4:
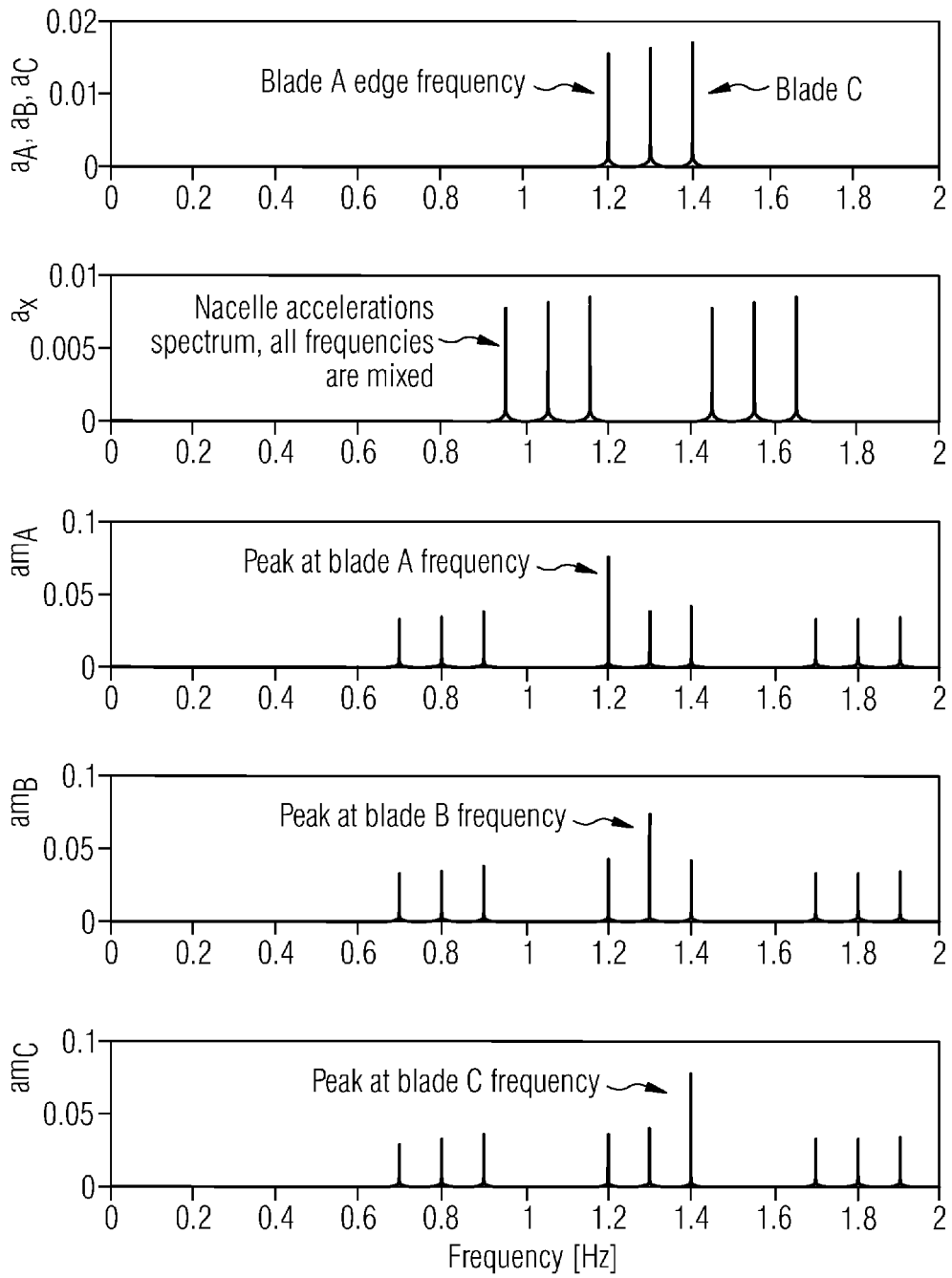
FIG. 4 shows the measured and modulated peaks of the frequency spectrum of each blade edge.

In FIG. 4, it can be seen, that the frequency spectrum for $am_A$ has its peak at the same frequency as the blade edge frequency $a_A$. It can also be seen that the blade frequency can not be separated just looking at the frequency spectrum for the nacelle acceleration ($a_X$).

Figure 5:
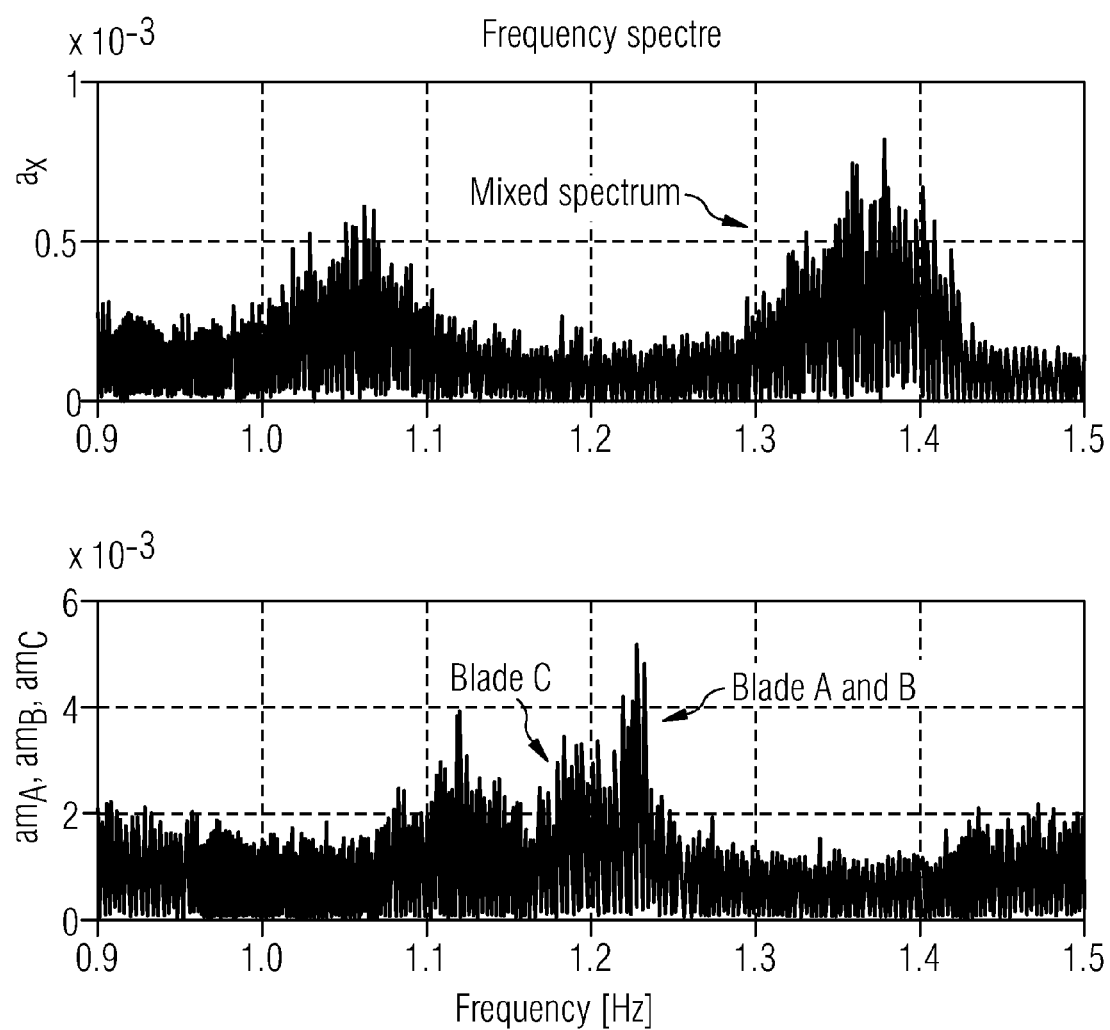
FIG. 5 shows respectively the total measured frequency spectrum and the modulated frequency spectrum of each blade.

FIG. 5 shows a plot for the frequency spectra for $a_X$ and $am_{A\ldots C}$. The frequency peaks can be seen at 1.19 [Hz] for blade C and 1.22 [Hz] for blade A and B. The frequency peak can be founded in the frequency domain, using a Fast Fourier Transformation (FFT or DFFT). The FFT data could then be smoothed using a filter and maximum value would be the blade edge frequency. The frequency peak could also be detected in the time domain, using a Phase Locked Loop (PLL) which synchronizes an internal oscillator with the $am_{A\ldots C}$ signal. When the PLL is synchronized, the PLL oscillator frequency will be equal to the blade frequency.

The edge frequency will be varying with changes in the temperature of the blade. There would also be some initial difference in the blade frequencies e.g. because of different mass distributions. Therefore the detection of the frequency change of one blade has to be with respect to the other blades. A method for detecting relative changes in the blade frequency is described in the formula below. The blade frequency for e.g. blade A ($f_A$) is subtracted by the mean value of the others blades ($F_B$ and $F_C$). The initial difference ($df_{A\ init}$) is subtracted to remove the initial deviation. This could be found by calculating the mean value for e.g. one day.

$$df_A = f_A - \frac{F_B + F_C}{2} - df_{A\_init}$$

$$df_B = f_B - \frac{F_A + F_C}{2} - df_{B\_init}$$

$$df_C = f_C - \frac{F_A + F_B}{2} - df_{C\_init}$$

Integrating the absolute value of the difference ($df_{A\ldots C}$) subtracted by an allowed difference ($df_{allowed}$) gives a signal that increases fast if there is great difference and slow when having small deviations. When the DiffLev$_A$ (the same analogy for DiffLev$_B$ and DiffLev$_C$) reaches a given level an alarm should be set and the turbine should be stopped.

DiffLev$_A$=DiffLev$_A$+|df$_A$|−df$_{allowed}$@DiffLev$_A \geqq 0$

Figure 6:
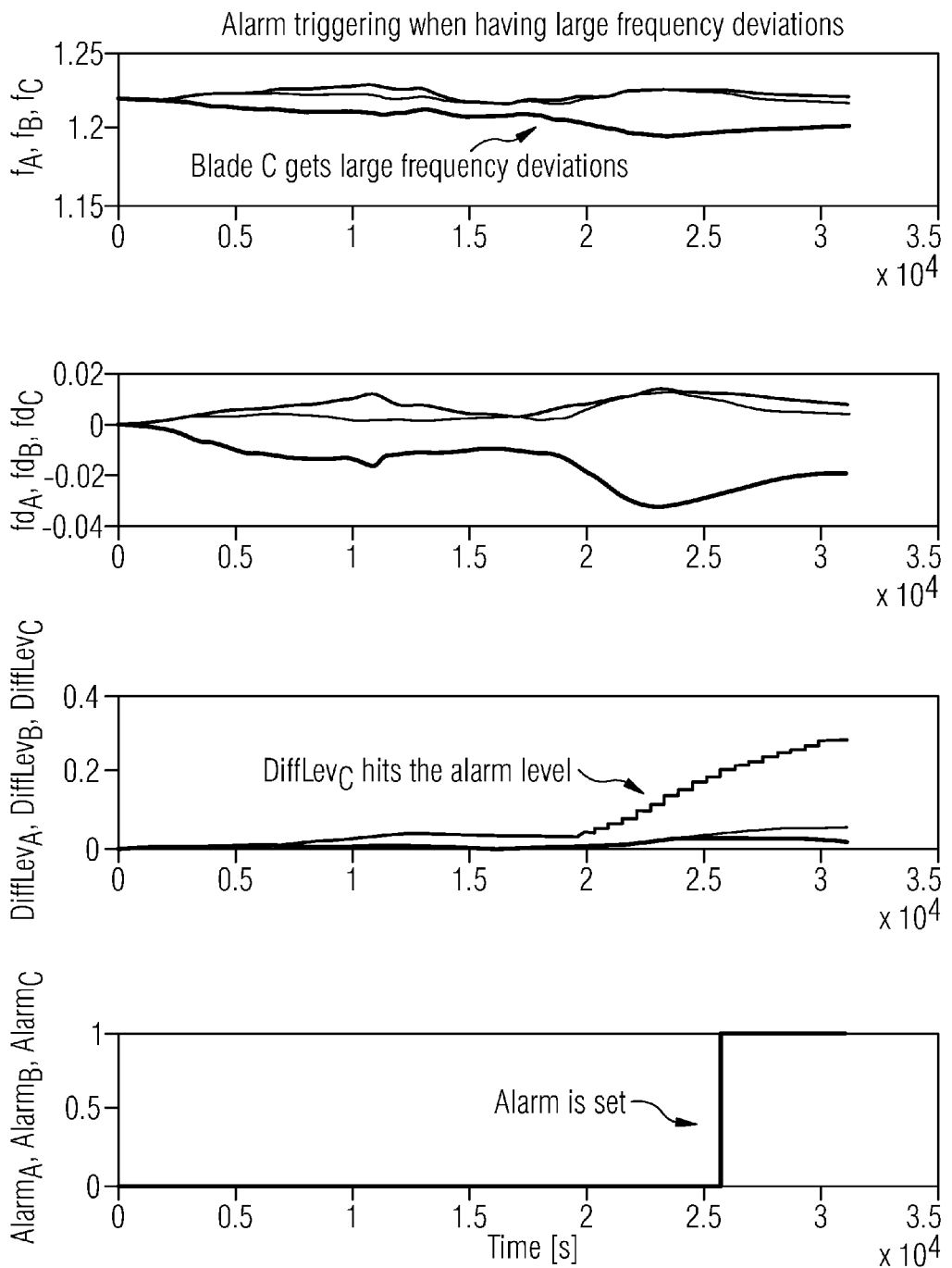
FIG. 6 shows an example of the calculated frequencies of each blade during a short period and how a change in frequency of one of the blades clearly is shown and triggering an alarm.

FIG. 6 shows an example where the blade C edge frequency is decreasing. When the allowed difference (fd$_C$) is reached, the difference level (DiffLev$_A$) begins to increase and trigs or sets the alarm, when it reaches 0.2.

The frequency difference could also be calculated by looking at the ratio between the frequencies instead of the absolute difference:

$$df_{BA} = \frac{F_B}{F_A} - df_{BA\_init}$$

$$df_{CA} = \frac{F_C}{F_A} - df_{CA\_init}$$

Frequency difference level detection:
1. If the difference is varying as a function of e.g. generator speed at normal operation without blade damage, the difference $df_{A\ldots C}$ should be integrated with a number of integrator which should perform the integration over a given speed interval.
2. The alarm could be set when a given maximum deviation is reached, without using the integrating method.

Figure 7:
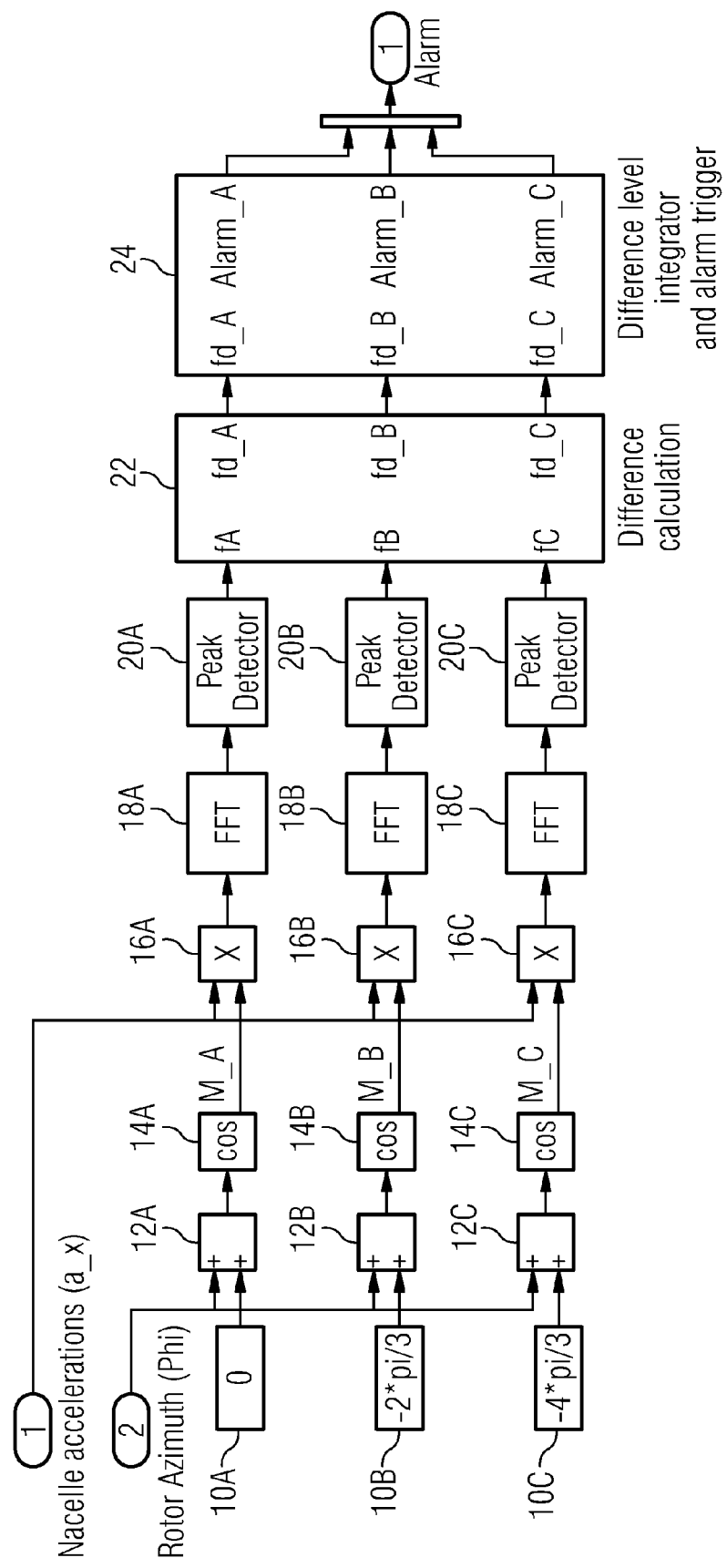
FIG. 7 shows a system for performing the method according to the invention.

A system for performing the method according to the invention is shown on FIG. 7, where the blade frequency is found by using a FFT on the modulated acceleration signal and thereby finding the peak in the spectrum.

The system comprises for each blade a memory 10A, 10B, 10C storing a phase factor for the respective blade, an adder 12A, 12B, 12C, a cosine function unit 14A, 14B, 14C, a multiplier 16A, 16B, 16C, an FFT-unit 18A, 18B, 18C, and a peak detector 20A, 20B, 20C. A difference calculation unit 22 and a difference level integrator 24 are common for all three rotor blades.

The multipliers 12A, 12B, 12C, are each connected to the respective one of the memories 10A, 10B, 10C for receiving the phase factor stored therein. They are each further connected to the rotor azimuth detector for receiving the detected rotor azimuth angle. In the adders 12A, 12B, 12C the respective phase factor is added to received rotor azimuth angle and the result is output to the cosine function unit, which calculates the cosine of the received sum of rotor azimuth angle and phase factor. The sum is then output to the respective multiplier 16A, 16B, 16C. Each multiplier 16A, 16B, 16C further receives the signal of the accelerometer located at the nacelle of the wind turbine. In the multipliers 16A, 16B, 16C the received accelerations are multiplied by the respective cosine output by the cosine function units 14A, 14B, 14C. The multiplication result, which represents a modulation of the sensed signals or vibrations, is then output to the respective FFT-unit 18A, 18B, 18C, where a fast fourier transformation is performed on the modulated signals or vibrations in order to extract each blade frequency.

The result of the fast fourier transformation is then output to the respected peak detector 20A, 20B, 20C where frequency peaks of the frequency spectra output by the FFT-units are detected and then output to the difference calculation unit 22. In the difference calculation unit the difference between the respective blade frequency and the function depending on the mean values of the other blades is calculated as described above. These differences are then input to the difference level integrator and alarm trigger 24 where the integration is done as described above and an alarm is triggered when the set criteria are reached.

Figure 8:
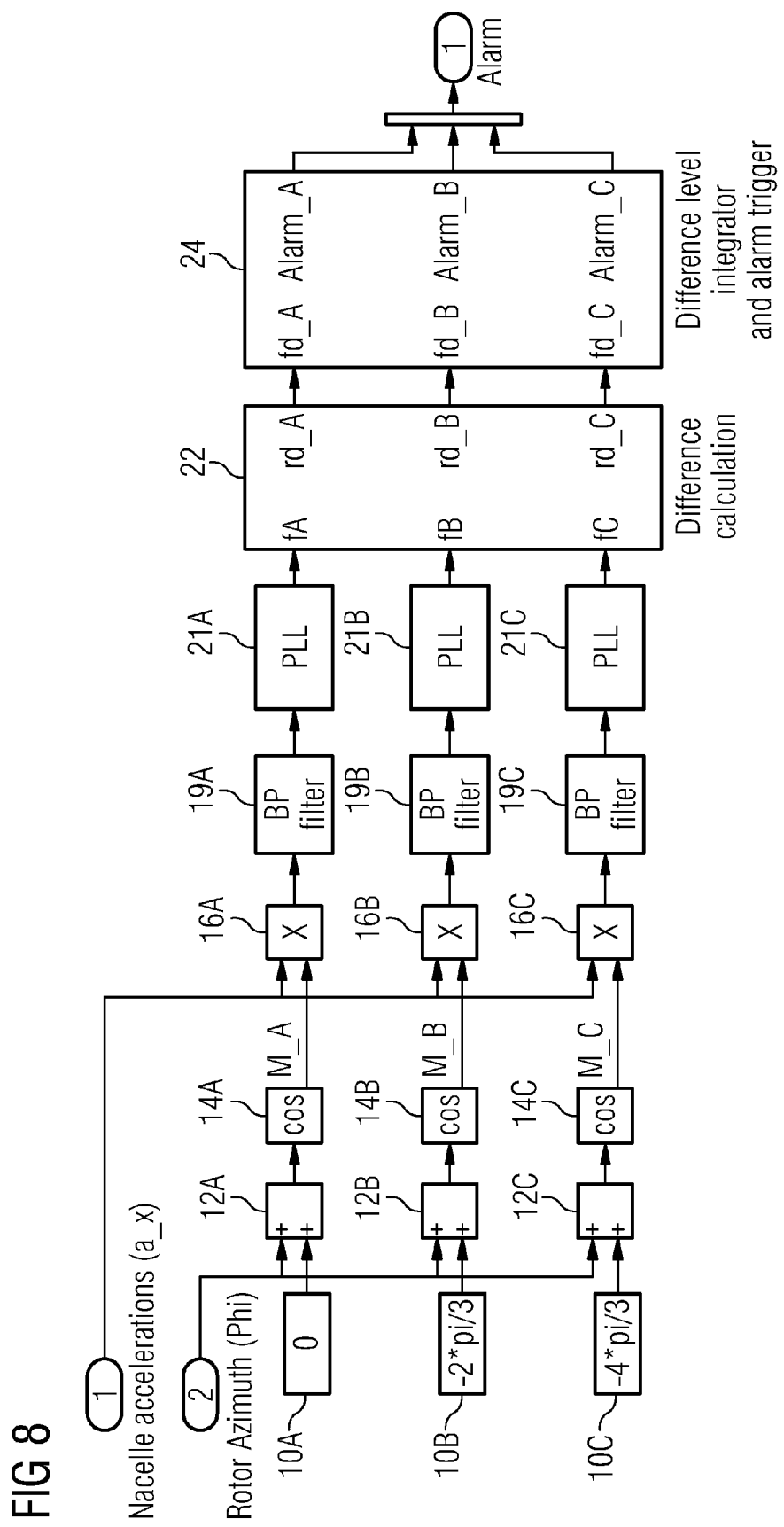
FIG. 8 shows an alternative system for performing the method according to the invention.

An alternative system for performing the method according to the invention is shown on FIG. 8, where the blade frequency is found by using a PLL 21A (Phase Locked Loop oscillation) on the modulated acceleration signal. In the present embodiment, band pass filters 19A, 19B, 19C are located between the multiplier 16A, 16B, 16C and the PLL 21A, 21B, 21C for filtering the modulated signals before inputting them into the respective PLL.

The invention claimed is:

1. A method for monitoring blade frequencies of a wind turbine comprising a tower, a nacelle, a hub and one or more rotating blades, the method comprising:
   sensing vibrations of the nacelle by a G-sensor, the G-sensor being placed in the nacelle;
   modulating sensed vibrations from the G-sensor; and
   extracting a blade frequency of each blade based upon modulated G-sensor signals.

2. The method as claimed in claim 1, wherein the vibrations are sensed by an accelerometer, the accelerometer being placed in the nacelle.

3. The method as claimed in claim 1, further comprising:
   sensing a rotating angle azimuth of each blade by a sensor.

4. The method as claimed in claim 3, wherein the modulating is done with a function taking into account the rotating angle azimuth of each blade.

5. The method as claimed in claim 4, wherein the modulating is based on the cosine of the rotating angle azimuth of each blade.

6. The method as claimed in claim 4, wherein the modulating is based on a sum of the cosine of the rotating angle azimuth of each blade and a constant number.

7. The method as claimed in claim 1, wherein the extracting of the blade frequency of each blade based upon the modulated G-sensor signals is done by applying a Fast Fourier Transformation on the modulated G-sensor signals.

8. The method as claimed in claim 1, wherein the extracting of the blade frequency of each blade based upon the modulated G-sensor signals is done by applying a Phase Locked Loop oscillation on the modulated G-sensor signals.

9. The method as claimed in claim 1, further comprising:
   comparing the blade frequency of each blade with each other to the other; and
   calculating a new frequency of each blade by using results of the comparing in order to calculate a change in the blade frequency of each blade.

10. The method as claimed in 9, further comprising:
    setting an alarm when the new frequency reaches a certain level.

11. The method as claimed in claim 1, further comprising:
calculating a new frequency of each blade based upon a difference between the blade frequency of each blade.

12. The method as claimed in claim 11, further comprising:
setting an alarm when the new frequency reaches a certain level.

13. A monitoring system monitoring blade frequencies of a wind turbine comprising a tower, a nacelle, a hub and one or more rotating blades, the system comprising:
   a G-sensor placed in the nacelle sensing vibrations of the nacelle in a transverse and/or a longitudinal direction;
   a sensor sensing the rotating azimuth angle of each blade,
   wherein the control unit comprises a modulation unit which modulates the sensed vibration signals,
   wherein the control unit further comprises a change detection unit detecting changes in an extracted blade frequency of each blade.

14. The monitoring system as claimed in claim 13, further comprising:
   a Fast Fourier Transformation unit which extracts the blade frequency of each blade based upon modulated signals.

15. The monitoring system as claimed in claim 13, further comprising:
   a Phase Locked Loop oscillation unit which extracts the blade frequency of each blade based upon modulated signals.

16. The monitoring system as claimed in claim 13, wherein the change detection unit comprises
   a difference calculation unit for calculating differences between the blade frequency of each blade, and
   a frequency calculation unit for calculating a new frequency of each blade based upon the calculated differences.

17. The monitoring system as claimed in claim 16, wherein the frequency calculation unit is an integrator integrating an absolute value of calculated differences.

18. The monitoring system as claimed in claim 16, further comprising:
   an alarm unit which sets an alarm and/or stops the wind turbine when a change of the blade frequency of each blade or the new frequency of each blade reaches a certain level.

19. The monitoring system as claimed in claim 18, wherein the alarm unit is integrated into the control unit.

* * * * *